(12) United States Patent
Lee et al.

(10) Patent No.: US 9,384,189 B2
(45) Date of Patent: Jul. 5, 2016

(54) APPARATUS AND METHOD FOR PREDICTING THE PLEASANTNESS-UNPLEASANTNESS INDEX OF WORDS USING RELATIVE EMOTION SIMILARITY

(71) Applicant: Foundation of Soongsil University-Industry Cooperation, Seoul (KR)

(72) Inventors: Soo Won Lee, Seoul (KR); Kang Bok Lee, Seoul (KR)

(73) Assignee: Foundation of Soongsil University—Industry Corporation, Seoul (KR)

( * ) Notice: Subject to any disclaimer, the term of this patent is extended or adjusted under 35 U.S.C. 154(b) by 23 days.

(21) Appl. No.: 14/519,801

(22) Filed: Oct. 21, 2014

(65) Prior Publication Data
US 2016/0062989 A1    Mar. 3, 2016

(30) Foreign Application Priority Data
Aug. 26, 2014    (KR) .................. 10-2014-0111735

(51) Int. Cl.
| | |
|---|---|
| *G06F 17/27* | (2006.01) |
| *G10L 25/63* | (2013.01) |
| *G06Q 10/04* | (2012.01) |
| *G06F 17/30* | (2006.01) |

(52) U.S. Cl.
CPC ...... *G06F 17/2785* (2013.01); *G06F 17/30687* (2013.01); *G06Q 10/04* (2013.01); *G10L 25/63* (2013.01)

(58) Field of Classification Search
CPC .................. G06F 17/2785; G06F 17/2765
USPC ............................................. 704/9
See application file for complete search history.

(56) References Cited

U.S. PATENT DOCUMENTS

| | | | | |
|---|---|---|---|---|
| 6,999,914 | B1 * | 2/2006 | Boerner | G06F 17/2785 704/1 |
| 7,289,949 | B2 * | 10/2007 | Warner | G06F 17/271 704/9 |
| 7,865,354 | B2 * | 1/2011 | Chitrapura | G06F 17/2785 704/4 |
| 9,009,024 | B2 * | 4/2015 | Zhang | 704/10 |
| 2008/0313130 | A1 * | 12/2008 | Hammond | G06F 17/30864 |
| 2009/0248399 | A1 * | 10/2009 | Au | G06F 17/27 704/9 |
| 2011/0029303 | A1 * | 2/2011 | Mizuguchi | G06F 17/2735 704/9 |

(Continued)

*Primary Examiner* — Shaun Roberts
(74) *Attorney, Agent, or Firm* — Mintz Levin Cohn Ferris Glovsky and Popeo, P.C.; Kongsik Kim (57) ABSTRACT

An apparatus and a method for predicting the pleasantness-unpleasantness index of words are disclosed. The disclosed apparatus includes: a computing unit configured to compute an emotion correlation between a word and one or more comparison word, compute emotion correlations between multiple reference words included in a reference word set and the one or more comparison word, compute multiple first absolute emotion similarity values between the word and the multiple reference words, and compute at least one second absolute emotion similarity value between a reference word and another reference word for all of the reference words included in the reference word set; and a prediction unit configured to predict the pleasantness-unpleasantness index of the word by using the multiple number of first absolute emotion similarity values, the at least one second absolute emotion similarity value, and a preset pleasantness-unpleasantness index of the multiple number of reference words.

8 Claims, 5 Drawing Sheets

(56) References Cited

U.S. PATENT DOCUMENTS

| | | | |
|---|---|---|---|
| 2011/0112825 A1* | 5/2011 | Bellegarda | G06F 17/2785 704/9 |
| 2013/0211838 A1* | 8/2013 | Park | G10L 13/10 704/260 |
| 2013/0254287 A1* | 9/2013 | Biswas | H04L 65/403 709/204 |
| 2013/0325437 A1* | 12/2013 | Lehman | G06F 17/2785 704/9 |
| 2014/0365208 A1* | 12/2014 | De Choudhury | G06Q 10/10 704/9 |

* cited by examiner

APPARATUS AND METHOD FOR PREDICTING THE PLEASANTNESS-UNPLEASANTNESS INDEX OF WORDS USING RELATIVE EMOTION SIMILARITY

CROSS-REFERENCE TO RELATED APPLICATIONS

This application claims the benefit of Korean Patent Application No. 10-2014-0111735, filed with the Korean Intellectual Property Office on Aug. 26, 2014, the disclosure of which is incorporated herein by reference in its entirety.

TECHNICAL FIELD

The present invention relates to an apparatus and a method for predicting the pleasantness-unpleasantness index of words, more particularly to an apparatus and method that allow more sophisticated text emotion analysis by predicting the degree of emotion (pleasantness-unpleasantness index) of a word which was not considered in prior word emotion prediction techniques.

This work was supported by the ICT R&D program of MSIP/IITP. [13-912-03-003, Development of Event Extraction and Prediction Techniques on Social Problems by Domains]

RELATED ART

The technology for predicting the emotions of words include techniques using correlations between words, techniques using large-scale dictionaries, techniques using ratings from product reviews, and the like, which perform analysis by differentiating positive and negative emotions.

Studies on this subject found in the related art include, for example, "Automatic Construction of Positive/Negative Feature-Predicate Dictionary for Polarity Classification of Product Reviews" (Song Jong-Seok, Lee Soo-Won; Korean Institute of Information Scientists and Engineers: Software and Applications; Vol. 38, No. 3, March 2011, pp. 157-168).

The techniques in the related art may analyze words as belonging to either of two emotions: positive or negative, and may hence be unable to perform analysis for multiple emotions. Also, as the techniques cannot distinguish 'strongly positive' and 'strongly negative' emotions, there is a limit to the level of sophistication achieved by such techniques.

SUMMARY

To resolve the problems above, an aspect of the invention aims to provide an apparatus and a method for predicting the pleasantness-unpleasantness index of words that allow more sophisticated text emotion analysis by predicting the degree of emotion (pleasantness-unpleasantness index) of a word which was not considered in prior word emotion prediction techniques.

To achieve the objective above, an embodiment of the present invention provides an apparatus for predicting the pleasantness-unpleasantness index of a word that includes: a computing unit configured to compute an emotion correlation between the word and one or more comparison word, compute emotion correlations between a multiple number of reference words included in a reference word set and the one or more comparison word, compute a multiple number of first absolute emotion similarity values between the word and the multiple number of reference words, and compute at least one second absolute emotion similarity value between a reference word and another reference word for all of the reference words included in the reference word set; and a prediction unit configured to predict the pleasantness-unpleasantness index of the word by using the multiple number of first absolute emotion similarity values, the at least one second absolute emotion similarity value, and a preset pleasantness-unpleasantness index of the multiple number of reference words.

In an embodiment of the invention, antonyms of the word can be omitted from the reference word set.

The computing unit can compute the emotion correlation between the word or the reference word and the comparison word by using a ratio between the probability of the word or the reference word and the comparison word appearing independently in a paragraph and the probability of the word or the reference word and the comparison word appearing together in a paragraph.

The computing unit can compute a first vector, which may have the emotion correlation between the word and the one or more comparison words as an element, and a multiple number of second vectors, which may have the emotion correlations between the reference words and the one or more comparison words as elements. The computing unit can compute the multiple number of first absolute emotion similarity values by using angles between the first vector and the second vectors, and can compute the at least one second absolute emotion similarity value by using angles between the multiple second vectors.

The computing unit can compute a relative emotion similarity value between the word and each the reference words (for a multiple number of relative emotion similarity values) by using the multiple first absolute emotion similarity values and the at least one second absolute emotion similarity value, and the prediction unit can predict the pleasantness-unpleasantness index of the word by using the multiple relative emotion similarity values and the pleasantness-unpleasantness index of the multiple reference words. An i-th relative emotion similarity value from among the multiple number of relative emotion similarity values can be computed using an i-th first absolute emotion similarity value between the word and an i-th reference word from among the multiple number of reference words and second absolute emotion similarity values between the i-th reference word and the reference words of the reference word set other than the i-th reference word.

The computing unit can compute the i-th relative emotion similarity value by using the equation shown below:

$$\text{relative\_similarity}(\vec{A}, \vec{B_i}) = \text{similarity}(\vec{A}, \vec{B_i}) - \sum_{B_j \in S} \frac{\text{similarity}(\vec{B_i}, \vec{B_j})}{|S|}$$

where $\vec{A}$ is a first vector, $\vec{B_i}$ is a second vector of an i-th reference word from among a multiple number of reference words, S is the reference word set, relative_similarity($\vec{A}, \vec{B_i}$) is the i-th relative emotion similarity value, similarity($\vec{A}, \vec{B_i}$) is the i-th first absolute emotion similarity value, $$\sum_{B_j \in S} \frac{\text{similarity}(\vec{B_i}, \vec{B_J})}{|S|}$$

is the second absolute emotion similarity values between the i-th reference word and the other reference words of the reference word set, and |S| is the size of the reference word set.

The prediction unit can predict the pleasantness-unpleasantness index of the word by using the equation shown below:

$$P/UNP_p = \sum_{i=1}^{N} \left( \frac{\text{relative\_similarity}(\vec{A}, \vec{B_i})}{\sum_{k=1}^{N} \text{relative\_similarity}(\vec{A}, \vec{B_k})} \times P/UNP_i \right)$$

where $P/UNP_p$ is the predicted pleasantness-unpleasantness index of the word, $\sum_{k=1}^{N} \text{relative\_similarity}(\vec{A}, \vec{B_k})$ is the sum of the relative emotion similarity values between the word and the reference words, N is the number of reference words, and $P/UNP_i$ is a preset pleasantness-unpleasantness index of the i-th reference word.

Another embodiment of the invention provides a method for predicting the pleasantness-unpleasantness index of a word that includes: computing an emotion correlation between the word and one or more comparison word; computing emotion correlations between a multiple number of reference words included in a reference word set and the one or more comparison word; computing a multiple number of first absolute emotion similarity values between the word and the multiple number of reference words; computing at least one second absolute emotion similarity value between a reference word and another reference word for all of the reference words included in the reference word set; and predicting the pleasantness-unpleasantness index of the word by using the multiple number of first absolute emotion similarity values, the at least one second absolute emotion similarity value, and a preset pleasantness-unpleasantness index of the plurality of reference words.

An embodiment of the invention enables more sophisticated text emotion analysis by predicting the degree of emotion (pleasantness-unpleasantness index) of a word which was not considered in prior word emotion prediction techniques.

Additional aspects and advantages of the present invention will be set forth in part in the description which follows, and in part will be obvious from the description, or may be learned by practice of the invention.

DETAILED DESCRIPTION

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like components.

The present invention adopts the premise that "if the correlation between words that appear concurrently in a sentence is high, then the degrees of emotion of two emotion words (i.e. words for expressing an emotion of a person) are similar" in predicting the pleasantness-unpleasantness index (degree of emotion) of a word. For this, a list in which certain emotion words and their pleasantness-unpleasantness index are recorded may be used to calculate the correlations between these corresponding words and words that appear concurrently. After calculating the correlations, similarity values between emotion words may be obtained, and such similarity values may be used to predict the pleasantness-unpleasantness index of the words.

Certain embodiments of the invention are described below in more detail with reference to the accompanying drawings.

Figure 1:
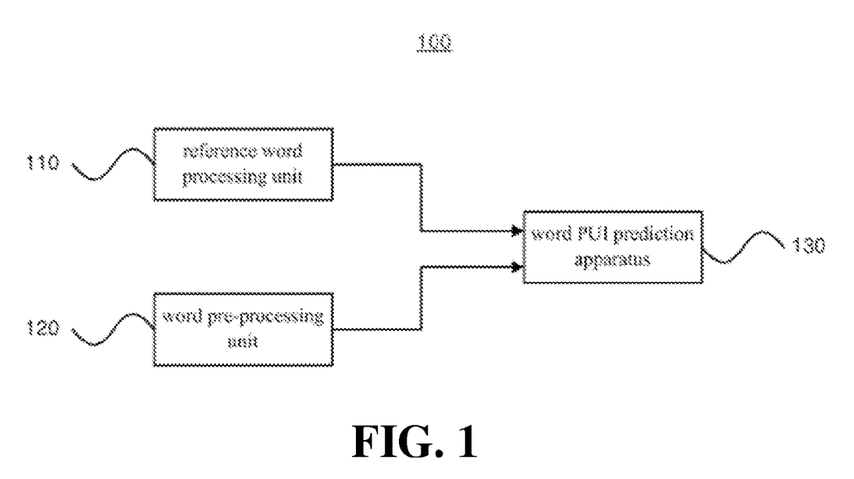
FIG. 1 is a diagram schematically illustrating the composition of a system for predicting the pleasantness-unpleasantness index of words using relative emotion similarity according to an embodiment of the invention.

FIG. 1 is a diagram schematically illustrating the composition of a system for predicting the pleasantness-unpleasantness index of words using relative emotion similarity according to an embodiment of the invention.

Referring to FIG. 1, a system 100 for predicting the pleasantness-unpleasantness index of words using relative emotion similarity according to an embodiment of the invention may include a reference word processing unit 110, a word pre-processing unit 120, and a word PUI prediction apparatus 130. The function of each component is described below with reference to FIG. 1. For convenience, the abbreviation PUI will be used to refer to the 'pleasantness-unpleasantness index', and the word for which the PUI is predicted will be referred to as the 'target word'.

The reference word processing unit 110 may process at least one word related to an emotion, to be used for predicting the PUI of the 'target word'. For convenience, such a word related to an emotion will be referred to as a 'reference word', to differentiate it from the 'target word' for which the PUI is predicted.

Figure 2:
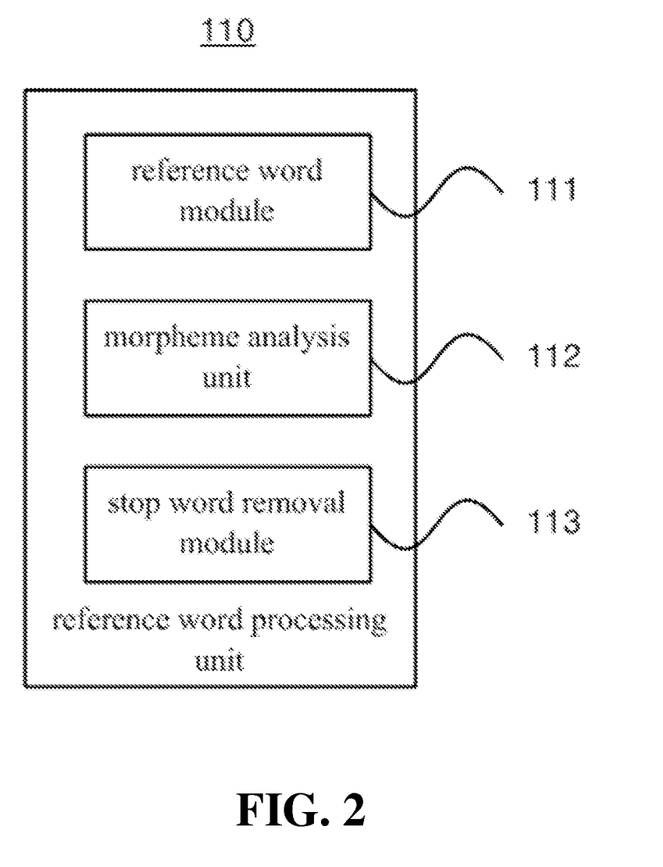
FIG. 2 is a diagram schematically illustrating the composition of a reference word processing unit according to an embodiment of the invention.

More specifically, the reference word processing unit 110 may set beforehand at least one 'reference word' and a PUI for the 'reference word'. For this, the reference word processing unit 110, as illustrated in FIG. 2, can include a reference word module 111, a morpheme analysis unit 112, and a stop word removal module 113. Here, the morpheme analysis unit 112 may tag each word with a suitable part of speech (e.g. indicating that 'love' is a noun), and the stop word removal module 113 may remove portions that have no actual meaning, such as the 's' in the word 'loves'.

Figure 3:
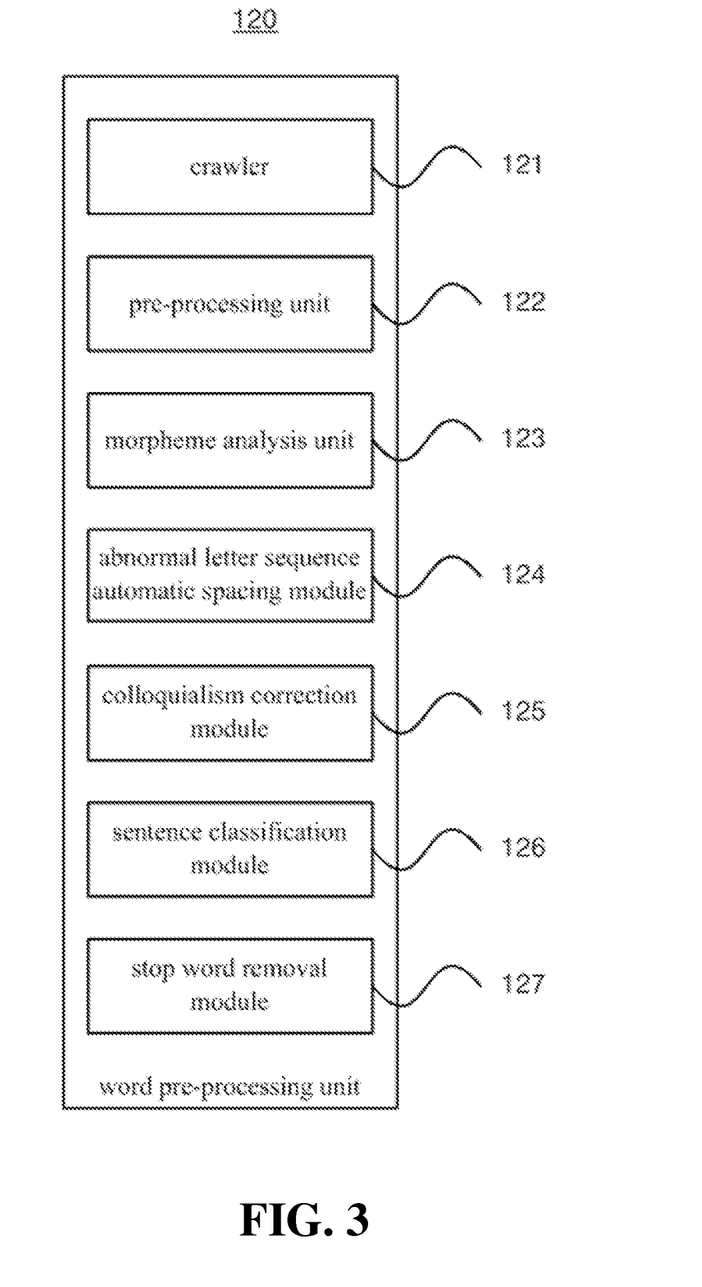
FIG. 3 is a diagram schematically illustrating the composition of a word pre-processing unit according to an embodiment of the invention.

Next, the word pre-processing unit 120 may extract a pre-processed sentence list from sentences such as those from online contents, etc., and extract pre-processed words from the pre-processed sentence list. For this, the word pre-processing unit 120, as illustrated in FIG. 3, may include a crawler 121, a pre-processing unit 122, a morpheme analysis unit 123, an abnormal letter sequence automatic spacing module 124, a colloquialism correction module 125, a sentence classification module 126, and a stop word removal module 127.

The word PUI prediction apparatus 130 may predict the PUI for the pre-processed words.

Figure 4:
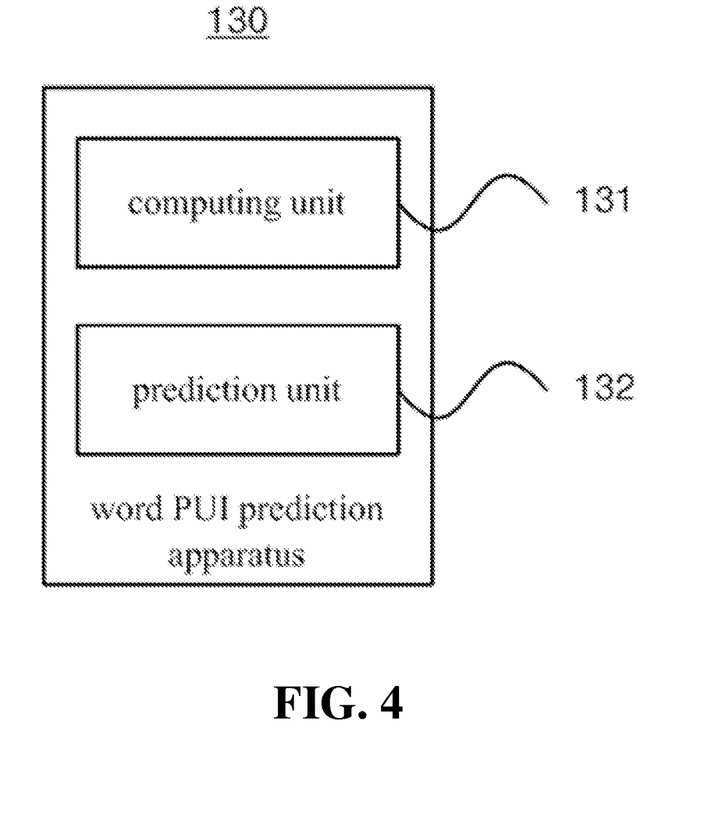
FIG. 4 is a diagram schematically illustrating the composition of an apparatus for predicting the pleasantness-unpleasantness index of words using relative emotion similarity according to an embodiment of the invention.
Figure 5:
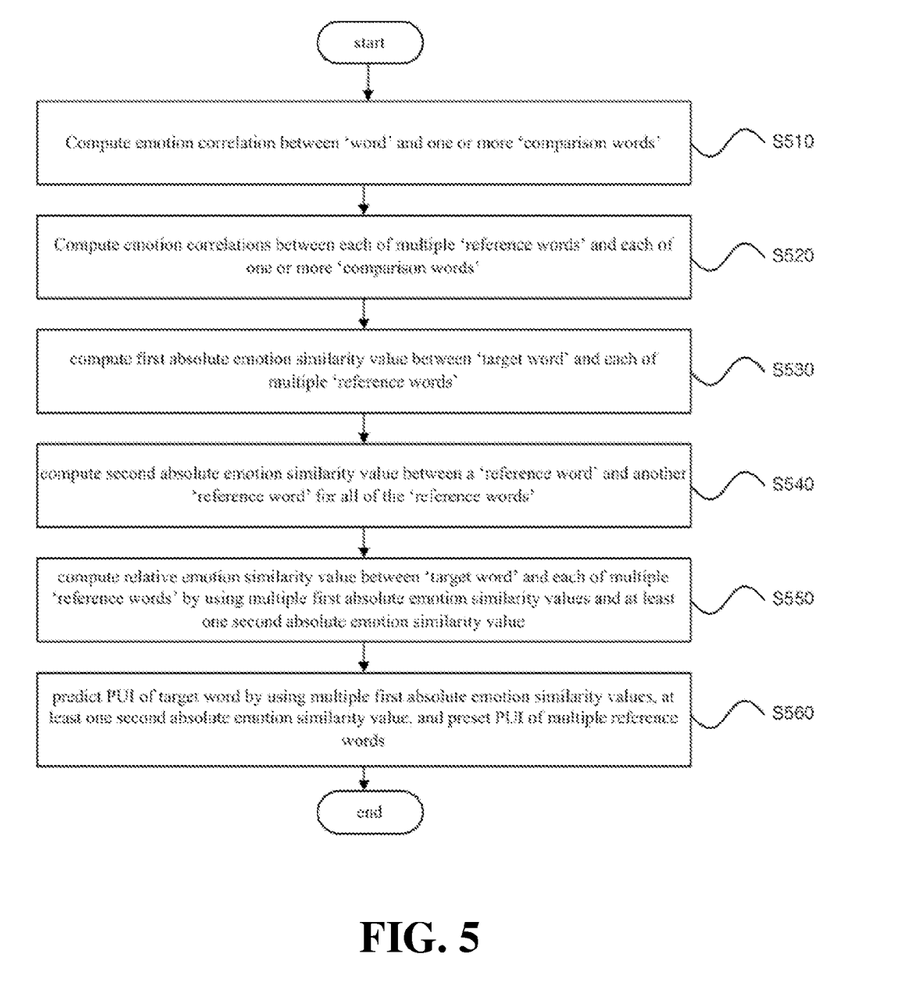
FIG. 5 is a flowchart schematically illustrating the process of a method for predicting the pleasantness-unpleasantness index of words using relative emotion similarity according to an embodiment of the invention.

To be more specific, a word PUI prediction apparatus 130 using relative emotion similarity may include a computing unit 131 and a prediction unit 132, as illustrated in FIG. 4. Also, FIG. 5 shows a flowchart illustrating the overall flow of the operations of a word PUI prediction apparatus 130 using relative emotion similarity (a method for predicting the PUI of words) according to an embodiment of the invention. The function of each component and the operations performed in each step are described below in more detail with reference to FIG. 4 and FIG. 5.

In operation S510, the computing unit 131 may compute the emotion similarity value between a 'target word' and a 'comparison word'. The computing unit 131 may compute the emotion similarity value repeatedly for all of the one or more 'comparison words'.

For example, consider a case that includes "exam" as the 'target word' and "relieve" and "uncertain" as 'comparison words'. There is an emotion correlation between "exam" and "relieve", and there is an emotion correlation between "exam" and "uncertain". Thus, the computing unit 131 may probabilistically compute how much emotional correlation there is between "exam" (the target word) and "relieve" (comparison word 1) and "uncertain" (comparison word 2).

According to an embodiment of the invention, the computing unit 131 can compute the emotion correlations between a 'target word' and a 'comparison word' by using the ratio between the probability of the 'target word' and the 'comparison word' appearing independently in a paragraph and the probability of the 'target word' and the 'comparison word' appearing together in a paragraph. As described above, this is based on the premise that "if the correlation between words that appear concurrently in a sentence is high, then the degrees of emotion of two emotion words are similar".

In one example, a computing unit 131 based on an embodiment of the invention can compute the emotion correlation between a 'target word' and a 'comparison word' by using a PMI (pointwise mutual information) index shown below in Equation 1.

$$PMI(A, B) = \log_2 \frac{P(A \cap B)}{P(A) \times P(B)} \quad \text{[Equation 1]}$$

Here, A is the 'target word', B is the 'comparison word', PMI(A, B) is the emotion correlation between the 'target word' and the 'comparison word', P(A)×P(B) is the probability of the 'target word' and the 'comparison word' appearing independently in a paragraph, and P(A∩B) is the probability of the 'target word' and the 'comparison word' appearing together in a paragraph.

Also, in operation S510, the computing unit 131 may further compute a first vector that has each of the emotion correlations between the 'target word' and the one or more 'comparison words' as an element. For example, the emotion correlations (first vector) between "Friday" (target word) and "enjoy, groove, fun, want, merry" (comparison words) and the emotion correlations (first vector) between "exam" (target word) and "regret, relieve, fright, remorse, uncertain" (comparison words) are as shown in Table 1.

TABLE 1

| | enjoy (B1) | groove (B2) | fun (B3) | want (B4) | merry (B5) |
|---|---|---|---|---|---|
| Friday (A) | [6.04, 5.53, 4.67, 4.60, 4.01] → first vector | | | | |

| | sorry (B1) | relieve (B2) | fright (B3) | remorse (B4) | uncertain (B5) |
|---|---|---|---|---|---|
| exam (A) | [5.87, 4.87, 4.87, 4.59, 3.92] → first vector | | | | |

Next, in operation S520, the computing unit 131 may compute the emotion correlations between the preset 'reference words' and the 'comparison words' in a manner similar to the case with the 'target word', computing the emotion correlations repeatedly for all of the multiple number of 'reference words'.

Similar to the case described above, a computing unit 131 according to an embodiment of the invention can compute the emotion correlations between the 'reference words' and the 'comparison words' by using ratios between the probability of a 'reference word' and a 'comparison word' appearing independently in a paragraph and the probability of a 'reference word' and a 'comparison word' appearing together in a paragraph. In one example, a computing unit 131 based on an embodiment of the invention can compute the emotion correlations between the 'reference words' and the 'comparison words' by using a PMI index shown below in Equation 2.

$$PMI(C, B) = \log_2 \frac{P(C \cap B)}{P(C) \times P(B)} \quad \text{[Equation 2]}$$

Here, C is the 'reference word', B is the 'comparison word', PMI(C, B) is the emotion correlation between the 'reference word' and the 'comparison word', P(C)×P(B) is the probability of the 'reference word' and the 'comparison word' appearing independently in a paragraph, and P(C∩B) is the probability of the 'reference word' and the 'comparison word' appearing together in a paragraph.

Also, the computing unit 131 may compute a second vector that has each of the emotion correlations between the 'reference words' and the one or more 'comparison words' as an element. The computing unit 131 may compute a second vector for each of the multiple number of 'reference words' (i.e. to yield a multiple number of second vectors). Differently put, the computing unit 131 may compute the emotion correlation between each of the 'reference words' included in the reference word set and each of the one or more 'comparison words', and as a result, compute a multiple number of second vectors. There can be many 'reference words', and the number of 'reference words' can be the top k number of 'reference words' (k being an integer greater than or equal to 1) having the highest emotion correlations.

Continuing with the description, in operation S530, the computing unit 131 may compute an absolute emotion similarity value between the 'target word' and each of the multiple 'reference words' (for a multiple number of absolute emotion similarity values).

An absolute emotion similarity value may be a measure of how much one word is emotionally related to another word.

For convenience, the absolute emotion similarity value between the 'target word' and a 'reference word' will hereinafter be referred to as a "first absolute emotion similarity value".

According to an embodiment of the invention, the computing unit 131 can compute the first absolute emotion similarity value between the 'target word' and a 'reference word' by using the angle between a first vector and a second vector, and this can be expressed as Equation 3 shown below.

$$\text{similarity}(\vec{A}, \vec{B_i}) = \cos\theta = \frac{\vec{A} \cdot \vec{B_i}}{|\vec{A}||\vec{B_i}|} \quad [\text{Equation 3}]$$

Here, similarity($\vec{A}$, $\vec{B_i}$) is the first absolute emotion similarity value (cosine similarity value), $\vec{A}$ is the first vector, and $\vec{B_i}$ is the second vector of the i-th reference word from among the multiple reference words (the i-th second vector). Therefore, the smaller the angle between the first vector and the second vector, i.e. the greater the value of the cosine, the higher the first absolute emotion similarity value between the 'target word' and the 'reference word'.

Table 2 shown below illustrates examples of first absolute emotion similarity values for a case in which the 'target word' is "happy" and five 'reference words' are "love, like, merry, joy, sad" and examples of first absolute emotion similarity values for a case in which the 'target word' is "remorse" and five 'reference words' are "regret, worry, angry, trouble, sin".

TABLE 2

|  | love (C1) | like (C2) | merry (C3) | joy (C4) | sad (C5) |
|---|---|---|---|---|---|
| happy (A) | 0.35 | 0.29 | 0.27 | 0.24 | 0.21 |

|  | regret (C1) | worry (C2) | angry (C3) | trouble (C4) | sin (C5) |
|---|---|---|---|---|---|
| remorse (A) | 0.15 | 0.12 | 0.10 | 0.10 | 0.09 |

Continuing with the description, in operation S540, the computing unit 131 may compute the absolute emotion similarity value between one 'reference word' and other 'reference words', for all 'reference words' included in the reference word set.

That is, within the reference word set, there exist one 'reference word' and at least one remaining 'reference word' other than the one 'reference word'. Here, the computing unit 131 can compute the absolute emotion similarity value between one 'reference word' and the other 'reference words', repeating the process for each case between one 'reference word' and at least one remaining 'reference word' to compute the absolute emotion similarity values. Also, the computing unit 131 can compute the absolute emotion similarity values for all of the 'reference words' within the reference word set, as described above. For convenience, the absolute emotion similarity value between a 'reference word' and another 'reference word' will hereinafter be referred to as a "second absolute emotion similarity value".

According to an embodiment of the invention, the computing unit 131 can compute the second absolute emotion similarity value between a 'reference word' and another 'reference word' by using the angle between second vectors, and this can be expressed as Equation 4 shown below.

$$\text{similarity}(\vec{B_i}, \vec{B_J}) = \cos\theta_{i,j} = \frac{\vec{B_i} \cdot \vec{B_J}}{|\vec{B_i}||\vec{B_J}|} \quad [\text{Equation 4}]$$

Here, similarity($\vec{B_i}$, $\vec{B_J}$) is the second absolute emotion similarity value, $\vec{B_i}$ is the second vector of a reference word from among the multiple reference words, and $\vec{B_J}$ is the second vector of the other reference word from among the multiple reference words.

For instance, if there are three reference words in the reference word set (S=($\vec{B_1}$, $\vec{B_2}$, $\vec{B_3}$)), then the computing unit 131 can compute three second absolute emotion similarity values (similarity($\vec{B_1}$, $\vec{B_2}$), similarity($\vec{B_1}$, $\vec{B_3}$), similarity($\vec{B_2}$, $\vec{B_3}$)).

Next, in operation S550, the computing unit 131 may compute a relative similarity value for the 'target word' and each of the multiple number of 'reference words' (for a multiple number of relative similarity values) by using the multiple first absolute emotion similarity values and at least one second absolute emotion similarity value.

The relative similarity value incorporates a relative similarity concept of emotion correlation, and the relative similarity value related to a 'target word' and a corresponding 'reference word' can be computed by using the first absolute emotion similarity value between the 'target word' and the corresponding 'reference word' and the second absolute emotion similarity values between the corresponding 'reference word' and other 'reference words'.

That is, according to an embodiment of the invention, an i-th relative similarity value from among the multiple relative similarity values can be computed by using the i-th first absolute emotion similarity value between the 'target word' and the i-th reference word from among the multiple number of 'reference words', and the second absolute emotion similarity values between the i-th 'reference word' and the other 'reference words' in the reference word set besides the i-th 'reference word'.

According to an embodiment of the invention, the computing unit 131 can compute the i-th relative similarity value for the 'target word' by using Equation 5 shown below.

$$\text{relative\_similarity}(\vec{A}, \vec{B_i}) = \text{similarity}(\vec{A}, \vec{B_i}) - \sum_{B_j \in S} \frac{\text{similarity}(\vec{B_i}, \vec{B_J})}{|S|} \quad [\text{Equation 5}]$$

Here, relative_similarity($\vec{A}$, $\vec{B_i}$) is the i-th relative similarity value, $$\sum_{B_j \in S} \frac{\text{similarity}(\vec{B_i}, \vec{B_J})}{|S|}$$

represents the second absolute emotion similarity values between the i-th reference word and the other 'reference words' within the reference word set, and |S| is the size of the reference word set.

Afterwards, in operation S560, the prediction unit 132 may predict the PUI of the target word by using the multiple first absolute emotion similarity values, at least one second absolute emotion similarity value, and the preset PUI of the multiple reference words. Here, the preset PUI of at least one reference word can be set by the reference word processing unit 110, as described above. Differently put, the prediction unit 132 can predict the PUI of the 'target word' by using multiple relative similarity values and the PUI of multiple reference words.

According to an embodiment of the invention, the prediction unit 132 can predict the PUI of a word by using Equation 6 shown below.

$$P/UNP_p = \sum_{i=1}^{N}\left(\frac{\text{relative\_similarity}(\vec{A}, \vec{B_i})}{\sum_{k=1}^{N}\text{relative\_similarity}(\vec{A}, \vec{B_k})} \times P/UNP_i\right) \quad \text{[Equation 6]}$$

Here, $P/UNP_p$ is the predicted pleasantness-unpleasantness index (PUI) of the word, $\Sigma_{k=1}^{N}$ relative_similarity($\vec{A}$, $\vec{B_k}$) is the sum of the relative emotion similarity values between the 'target word' and the multiple 'reference words', N is the number of 'reference words', and $P/UNP_1$ is a preset PUI of the i-th reference word.

For example, consider a case in which the 'target word' is "pity" and five 'reference words' are "nervous, resent, unfair, absurd, sympathize", where the PUI that were preset for the five 'reference words' are "3.24, 2.27, 1.90, 2.48, 3.45", respectively, and the relative similarity values between the 'target word' and the 'reference words' as computed by the computing unit 131 are "0.0966, 0.0729, 0.0700, 0.0787, 0.0626", respectively. In this case, the sum of the emotion similarity values is 0.3808, and the predicted pleasantness-unpleasantness index ($P/UNP_p$) of the word can be 2.7252. This is similar to the actual value of "2.92" computed by the reference word processing unit 110 according to the technology published in "Making a List of Korean Emotion Terms and Exploring Dimensions Underlying Them" for the 'target word' (pity).

There may also be occurrences in which a high emotion similarity value is obtained between a target word and its antonym. If the reference word set includes antonyms, there may be large discrepancies from actual values when predicting the PUI of a word.

Thus, according to an embodiment of the invention, antonyms of the target word may be excluded from the reference word set. If all of the reference words of the reference word set are antonyms of the target word, then a prediction value can be computed according to the PUI of the emotion index dictionary as published in the study "Making a List of Korean Emotion Terms and Exploring Dimensions Underlying Them".

As set forth above, an embodiment of the invention enables more sophisticated text emotion analysis by predicting the degree of emotion (pleasantness-unpleasantness index) of a word which was not considered in prior word emotion prediction techniques.

The embodiments of the present invention can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

While the present invention has been described above using particular examples, including specific components, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. An apparatus for predicting a pleasantness-unpleasantness index of a word using a computer, the apparatus comprising:
a computing unit configured to compute an emotion correlation between the word and one or more comparison word, compute emotion correlations between a plurality of reference words included in a reference word set and the one or more comparison word, compute a plurality of first absolute emotion similarity values between the word and the plurality of reference words, and compute at least one second absolute emotion similarity value between a reference word and another reference word for all of the plurality of reference words included in the reference word set; and
a prediction unit configured to predict the pleasantness-unpleasantness index of the word by using the plurality of first absolute emotion similarity values, the at least one second absolute emotion similarity value, and a preset pleasantness-unpleasantness index of the plurality of reference words, wherein
antonyms of the word are not included in the reference word set, and
the computing unit and the prediction unit are embodied on the computer.

2. The apparatus of claim 1, wherein the computing unit computes the emotion correlation between the word or the reference word and the comparison word by using a ratio between a probability of the word or the reference word and the comparison word appearing independently in a paragraph and a probability of the word or the reference word and the comparison word appearing together in a paragraph.

3. The apparatus of claim 1, wherein the computing unit computes a first vector and a plurality of second vectors, the first vector having the emotion correlation between the word and the one or more comparison words as an element, the second vectors having the emotion correlations between the plurality of reference words and the one or more comparison words as elements, and the computing unit computes the plurality of first absolute emotion similarity values by using angles between the first vector and the plurality of second vectors, and computes the at least one second absolute emotion similarity value by using angles between the plurality of second vectors.

4. The apparatus of claim 3, wherein the computing unit computes a relative emotion similarity value between the word and each the plurality of reference words (a plurality of relative emotion similarity values) by using the plurality of first absolute emotion similarity values and the at least one second absolute emotion similarity value, and the prediction unit predicts the pleasantness-unpleasantness index of the word by using the plurality of relative emotion similarity values and the pleasantness-unpleasantness index of the plurality of reference words, and an i-th relative emotion similarity value from among the plurality of relative emotion similarity values is computed using an i-th first absolute emotion similarity value between the word and an i-th reference word from among the plurality of reference words and second absolute emotion similarity values between the i-th reference word and the reference words of the reference word set other than the i-th reference word.

5. The apparatus of claim 4, wherein the computing unit computes the i-th relative emotion similarity value by using an equation shown below:

$$\text{relative\_similarity}(\vec{A}, \vec{B_i}) = \text{similarity}(\vec{A}, \vec{B_i}) - \sum_{B_j \in S} \frac{\text{similarity}(\vec{B_i}, \vec{B_j})}{|S|}$$

where $\vec{A}$ is a first vector, $\vec{B_i}$ is a second vector of an i-th reference word from among the plurality of reference words, S is the reference word set, relative_similarity($\vec{A}, \vec{B_i}$) is the i-th relative emotion similarity value, similarity ($\vec{A}, \vec{B_i}$) is the i-th first absolute emotion similarity value, $$\sum_{B_j \in S} \frac{\text{similarity}(\vec{B_i}, \vec{B_j})}{|S|}$$

is the second absolute emotion similarity values between the i-th reference word and the other reference words of the reference word set, and |S| is a size of the reference word set.

6. The apparatus of claim 4, wherein the prediction unit predicts the pleasantness-unpleasantness index of the word by using an equation shown below:

$$P/UNP_p = \sum_{i=1}^{N} \left( \frac{\text{relative\_similarity}(\vec{A}, \vec{B_i})}{\sum_{k=1}^{N} \text{relative\_similarity}(\vec{A}, \vec{B_k})} \times P/UNP_i \right)$$

where $P/UNP_p$ is the predicted pleasantness-unpleasantness index of the word, $\Sigma_{k=1}^{N}$ relative_similarity($\vec{A}, \vec{B_k}$) is a sum of the relative emotion similarity values between the word and the plurality of reference words, N is a number of the plurality of reference words, and $P/UNP_i$ is a preset pleasantness-unpleasantness index of the i-th reference word.

7. A method for predicting a pleasantness-unpleasantness index of a word using a computer, the method comprising:

computing, by the computer, an emotion correlation between the word and one or more comparison word;

computing, by the computer, emotion correlations between a plurality of reference words included in a reference word set and the one or more comparison word;

computing, by the computer, a plurality of first absolute emotion similarity values between the word and the plurality of reference words;

computing, by the computer, at least one second absolute emotion similarity value between a reference word and another reference word for all of the plurality of reference words included in the reference word set; and predicting, by the computer, the pleasantness-unpleasantness index of the word by using the plurality of first absolute emotion similarity values, the at least one second absolute emotion similarity value, and a preset pleasantness-unpleasantness index of the plurality of reference words, wherein antonyms of the word are not included in the reference word set.

8. A non-transitory computer-readable recorded medium tangibly embodying a program of instructions for performing the method of claim 7.

* * * * *